(No Model.) 2 Sheets—Sheet 1.
L. S. COLE.
FISHING REEL.
No. 505,216. Patented Sept. 19, 1893.
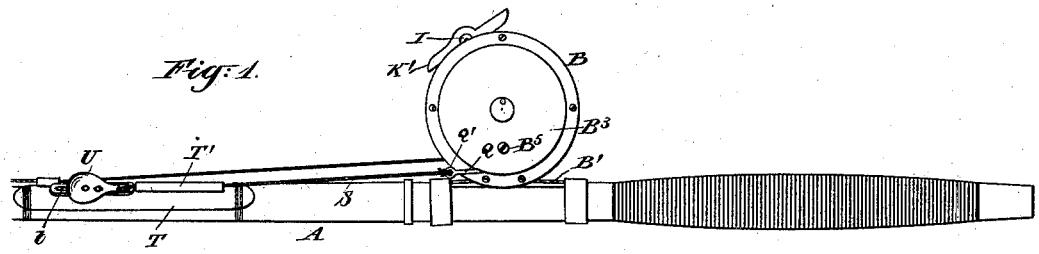
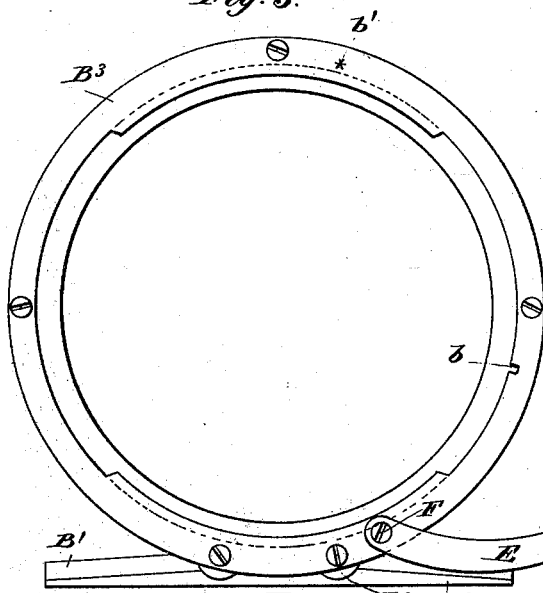
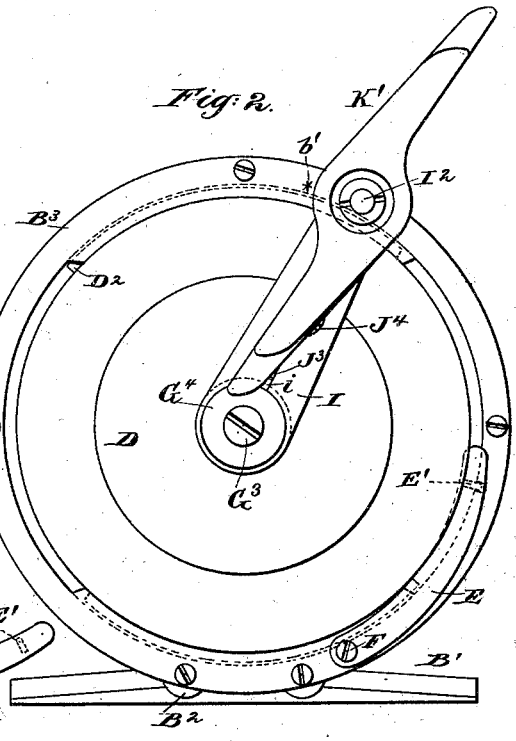
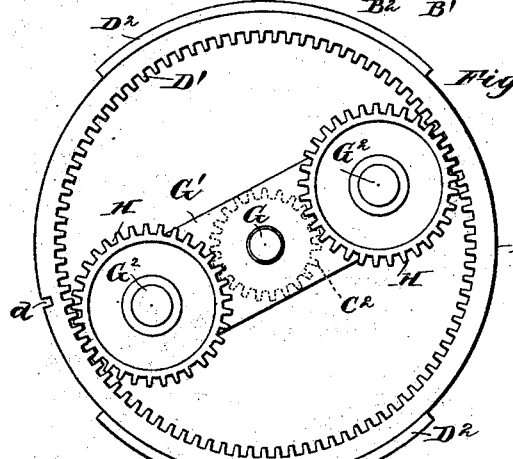
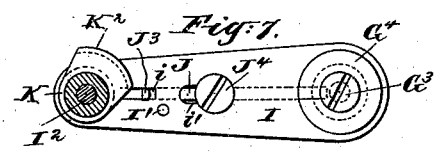
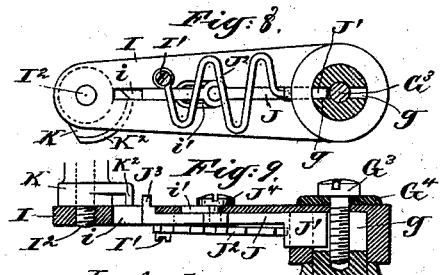
Witnesses:
Charles R. Searle.
M. F. Boyle
Inventor:
Leander S. Cole
by his attorney
Thomas Drew Stetson (No Model.) 2 Sheets—Sheet 2.
L. S. COLE.
FISHING REEL.
No. 505,216. Patented Sept. 19, 1893.
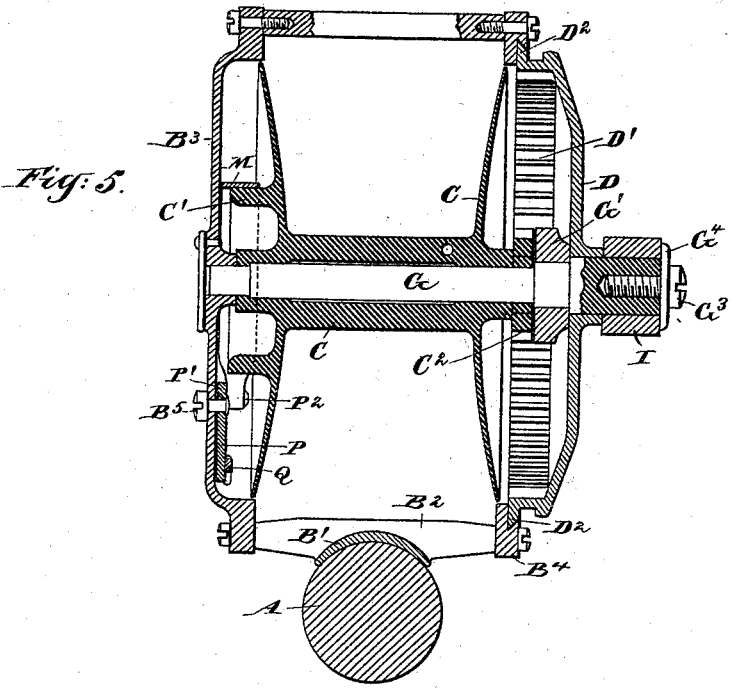
Fig. 5.
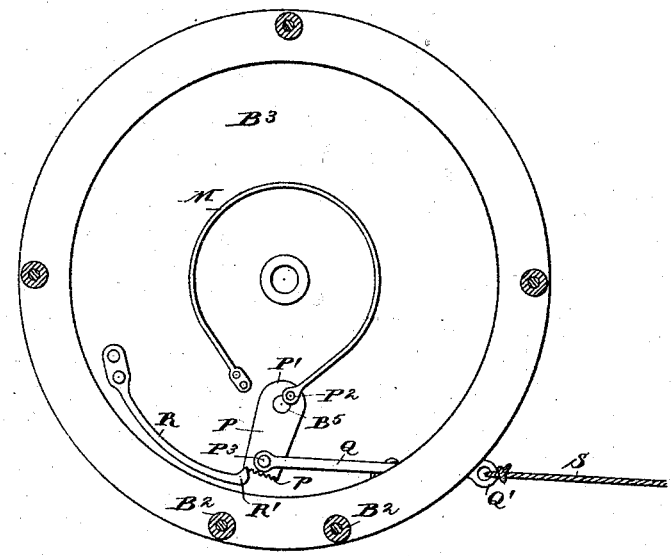
Fig. 6.
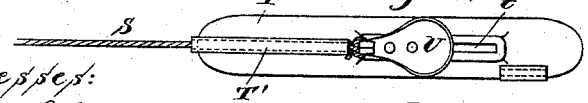
Fig. 10.
Fig. 11.
Witnesses:
Charles R. Searle
M. F. Boyle
Inventor:
Leander S. Cole
by his attorney

UNITED STATES PATENT OFFICE.

LEANDER S. COLE, OF KINGSTON, MASSACHUSETTS.

FISHING-REEL.

SPECIFICATION forming part of Letters Patent No. 505,216, dated September 19, 1893.

Application filed February 27, 1893. Serial No. 463,785. (No model.)

*To all whom it may concern:*

Be it known that I, LEANDER S. COLE, a citizen of the United States, residing at Kingston, in the county of Plymouth and State of Massachusetts, have invented a certain new and useful Improvement in Fishing-Reels, of which the following is a specification.

My improved reel is intended more particularly for tarpon and other fish which are not only gamy but of large size and require that the pole shall be grasped by one hand at a point considerably beyond the reel. I provide a brake on the reel with a connection to a movable thumb-piece at the required point on the pole so that the left hand can operate the brake. I construct the brake in the form of a band encircling a drum on the end of the spool, and operate through a lever which applies such brake-band. I arrange the band so that it can be applied with its full force, or with any lesser degree, as required. I provide means whereby the same parts may be used to serve automatically as a gentle brake or drag. I provide for disconnecting the crank from the spool, and for throwing it instantly into engagement when required by a very simple movement. I construct the framing with a large aperture at one side through which the entire spool may be inserted and removed axially. I close the casing by partial screw-threads, and secure the work against disengagement by a spring-dog. The gearing for increasing the speed of the spool relatively to the crank is attained by fixed internal gear on the casing, a smaller pinion on the spool, boring centrally through such pinion and through the spool and fitting therein a removable shaft of small diameter which shaft performs the double function of an axis for the spool and a shaft carrying arms for a set of planet wheels to be traversed between the internal gear and the pinion and transmit the motion.

The accompanying drawings form a part of this specification and represent what I consider the best means of carrying out the invention.

Figure 1 is an elevation of the reel and its attachments. Figs. 2 to 9 inclusive, are on a larger scale. Fig. 2 is a view of the opposite side from that shown in Fig. 1, in condition for use. Fig. 3 represents the same after the central portion of the side plate and the crank and reel have been removed. Fig. 4 is a view of the reverse side or interior of the removable head and its attached shaft cross-bar and gearing. Fig. 5 is a central longitudinal cross section showing the principal parts, the intermediate gear wheels which transmit the motion from the internal gear to the pinion on the spool being omitted. Fig. 6 is an inside view of the opposite side plate with its brake-band and operating means. Fig. 7 is a view of the outer face of the crank with a cross-section of the sleeve that carries the handle. Fig. 8 is a view of the opposite face of the crank with a cross section of the shaft. Fig. 9 is a central longitudinal section of the crank. Figs. 10 and 11 are on a smaller scale. Fig. 10 is a face view of the thumb piece and the immediately adjacent parts, and Fig. 11 is a central cross section through the same.

Similar letters of reference indicate corresponding parts in all the figures where they appear.

A is the pole, which may be of any ordinary or suitable character, having sufficient strength to serve with large fish.

B is the framing or case, certain portions being designated, when necessary, by supernumerals, as B'. The "feet" of the case may be secured to the pole by the ordinary sliding rings, but it is esteemed preferable in this class of fishing to seize these parts very firmly together by a waxed twine.

B' are the feet by which the framing is secured to the pole, and $B^2$ the cross-bars which connect the feet to the two side-plates $B^3$, $B^4$. One side-plate, $B^3$, is a continuous plate; the other, $B^4$, is an annular ring of sufficient strength, and provided with partial screw-threads but with its interior open to allow the entire spool C to be taken out and inserted by an endwise movement.

D is a removable head, of sufficient thickness and hollowed, equipped with internal gear D' and with external partial screw-threads $D^2$. In the exterior is formed a nick $d$ which performs an important function.

The interior of the annular end of the side-plate B⁴ is partially screw-threaded to match the partial screw-threads D², and is provided with a nick $b$ and with a mark $b'$ about ninety degrees therefrom. This nick $b$ with the nick $d$ receives a rectangular spur E' carried on the spring-dog E which is pivoted to the exterior of the framing at F. The center of the head D has a projecting boss which affords a good bearing for a slender shaft G of steel which extends through a corresponding axial hole bored in the spool, and is supported in a suitable bearing in the inner face of the side-plate B³. I fix on this shaft just within the bearing in the side-plate B⁴ a sufficiently stout cross-bar G' which carries studs G², G², on each of which is mounted a spur gear-wheel H which meshes in the internal gear D', and also into the pinion C² on the spool C, and by traversing around communicates a rapid rotary motion to the latter.

In applying the parts together after the spool is properly inserted, the head D with its attachments is brought into position, and the shaft G thrust axially through the central hole, and the head turned until its nick $d$ coincides with the mark $b'$ on the exterior of the side-plate B⁴, and then pressed home. Next, the head D is turned a partial revolution which engages the partial screw-threads. When it has been turned to a sufficient extent, the nick $d$ matches the nick $b$, and now the spring-dog E being swung around into position it engages in both the nicks $b$ and $d$, and holds the head against being unscrewed by any force. When it is desired to take the reel apart, the thumb-nail, or other convenient means, being applied to raise the dog E out of its engagement against the force of the spring, it can be turned around on the pivot F, and now the head D being seized by its milled edge it can be turned in the direction to unscrew, and when the nick $d$ has reached the mark $b'$ the head with its attachments can be removed.

The ease with which my reel can be opened and the parts reliably returned to place and secured facilitates cleaning when, as is frequently the case, the joints receive sand or other solid material.

I, I², is the crank on the shaft G, retained by a screw G³ and washer G⁴, with liberty to revolve freely, or to allow the shaft and its attachments to revolve freely without the crank. I provide for engaging this crank with the shaft at the times required by means of a slide J moving in a radial groove on the inner face of the crank, and carrying a dog J' which penetrates the hub and is urged inward by a spring J² abutting against a screw I' on the crank. When this is allowed to be forced inward by the spring, it engages in a spline groove $g$ in the shaft.

J³ is a stud set in the slide J, and extending through a slot $i$ in the crank.

J⁴ is a screw tapped into the slide J and moving in a radial slot $i'$ in the crank.

K is a sleeve, mounted with liberty to revolve on a sufficiently stout crank-pin I² set in the crank I. Its outer end carries a handle K' adapted to receive the action of the hand in the important work of turning the crank I, with the shaft G and its cross-bar G' and connected gears H to operate the pinion C² and the connected spool to reel in the line. The sleeve K carries also a segment or partial lip K² which performs an important function in holding and releasing the slide J and its attached dog J'.

To liberate the spool, a sufficient force is applied by the finger to the head of the screw J⁴ and the slide J is moved radially outward against the force of the spring J². Next, the sleeve K is partially revolved and the lip K² is caused to engage with the stud J². This holds the dog J' out of engagement with the groove in the shaft G, and so long as this condition obtains in the crank the line is free to run out, controlled only by the brake or drag, which will be presently described. But when it is desired to engage the crank, all that is necessary is to turn it, holding the handle K' firmly. A partial revolution of the crank thus conditioned carries the segment or lip K² out of engagement with the stud J³, and the slide J is moved inward by the force of the spring J² and engages the dog J' in the spline $g$. It remains engaged and the crank may be used in the ordinary manner until the proper steps are taken to draw the slide J again outward on the crank I and again lock it by the segment K².

The braking is effected at the other side, the left side, of the reel. The left head of the spool C is formed with a drum C'. This is encircled by a brake-band M, having one end secured rigidly to the inner head of the side-plate B³ of the casing, and the other end secured by a pin P² to a disk P' which is fixed to a lever P fitted to revolve on a stud B⁵. The brake-band M exerts a gentle spring force tending to straighten. This force tends to hold it always in the position shown in Fig. 6, in which position the brake is of no effect.

Q is a link turning on a pivot P³, set in the lever P, and playing freely through an aperture in the casing, its outer end being provided with an eye Q'. The end of the lever P is notched or roughened, as indicated by $p$, which is engaged by a spring-dog R' carried on a spring R fixed on the side-plate B³. When the link Q is pressed axially, it forces the lever into the position which engages the dog R' with the notches $p$ and holds it with gentle force. Such movement by changing the position of the pin P² draws the brake-band M into gentle engagement with the drum C'. This serves as what is technically known as a drag on the line, and the resistance to the running out or reeling in may be varied at will by turning the lever P in one direction or the other by thrusting or pulling on the link Q. I provide for operating this same brake-band M so as to relieve it from drag and allow it to run freely, or to apply the brake with any degree of force at will. This is effected through a simple device operated by the left hand grasping the pole at the proper distance outward beyond the reel. T is a plate seized on to the pole A at the required point. There is a connection by a cat-gut S leading from the link Q through a runner T' to a thumb-piece U which is free to move longitudinally, guided by a groove $t$. The left hand may grasp the pole with any degree of force, taking care not to press on the cord S, the thumb engaging with the thumb-piece U. When it is desired to apply the brake, a thrusting action of the thumb operates through the cord S, and by carrying the pin $P^2$ forcibly around applies the brake-band M to the drum C' with any required degree of force. Relaxing the force of the thumb, and aiding it to work still quicker, if preferred, by a drawing action of the thumb, liberates the brake partially or entirely whenever desired.

My invention allows the spool to be set free at leisure, and to be controlled by the brake alone during all the preliminary conditions and to be without labor or attention instantly connected to the crank when occasion arises. It avoids the great trouble and the risk of the loss of parts which attend the opening of the ordinary reel in case sand or other foreign matter is taken in. The slender shaft G serves as a center for the spool and provides a long bearing favorably supported for the crank, and with the cross-bar and gearing employed communicates the power with little friction or other loss very directly from the crank-shaft to the spool. It allows the left hand to apply and take off and modify the action of the brake and it allows the same brake to work automatically as a drag.

Modifications may be made without departing from the principle or sacrificing the advantages of the invention. As shown, the head D requires to be turned about a quarter of a revolution to detach it from the framing. If it were changed to a sixth or an eighth for the length of the segments of the partial screws, there would be a correspondingly less turning required to engage or disengage the head. I have shown the partial screw-threads as each extending around about a quarter of the periphery, and the spaces about a quarter; but each may be a sixth or an eighth, if preferred.

Instead of notching the surface $p$, of the lever P, and providing the spring R with a dog R' to engage in such notches, it will be obvious that the notches may be in the spring, and the dog may be on the lever, or that the lever may be held for use as a drag by a sufficient friction of the spring pressing on the smooth end or side of the lever.

I claim as my invention—

1. In a fishing-reel, the case B having a side plate $B^4$ with a large aperture adapted to allow the spool to be introduced and removed therethrough, and with a removable head D and the partial screw-threads $D^2$ for securing and releasing the latter at will, as herein specified.

2. In a fishing-reel, the case B having a side-plate $B^4$ with a large aperture adapted to allow the spool to be introduced and removed therethrough, and with a removable head D and provisions for securing and releasing the latter at will by means of partial screw-threads $D^2$ and with a dog E adapted to be engaged in nicks $b, d$, and easily inserted and removed, all substantially as herein specified.

3. In a fishing-reel, the combination with a removable head D, having internal gear D', of a spool C having a hollow center and a pinion $C^2$, a central shaft G carrying a cross-bar G' and studs $G^2$ and gears H, arranged for joint operation all substantially as herein specified.

4. In a fishing-reel, having a shaft G and suitable gearing connecting therefrom to a spool C, a loosely connected crank I and a dog J', spring $J^2$ and the stud $J^3$ for engaging and releasing such crank, in combination with each other and with the segment $K^2$ carried on the sleeve K adapted to be turned relatively to the crank in the act of operating the crank, all arranged for joint operation substantially as herein specified.

5. In a fishing-reel, having a spool carrying a drum C', a brake-band M adapted to act on such drum, a thumb-piece U mounted on a separate plate T fixed to the rod at another point and the cord S and link Q from such thumb-piece to the brake lever P for allowing the brake to be applied and released, by the hand grasping the pole beyond the reel, as herein specified.

6. In a fishing-reel, a brake-band M and operating device comprising the brake-lever P, disk P' and pin $P^2$ connecting the brake-band with said lever, adapted to serve at will, in combination with the spring-dog R R', and roughened surface $p$ on the lever P, engaging together when required, for holding such device automatically to serve as a drag, all substantially as herein specified.

In testimony that I claim the invention above set forth I affix my signature in presence of two witnesses.

LEANDER S. COLE.

Witnesses:
CHARLES R. WOOD,
JNO. W. CHURCHILL.